United States Patent
Jakka et al.

(10) Patent No.: US 10,224,716 B2
(45) Date of Patent: Mar. 5, 2019

(54) APPARATUS FOR GENERATING AC SUPERIMPOSED DC SIGNAL

(71) Applicant: Indian Institute of Technology Bombay, Mumbai (IN)

(72) Inventors: Venkat Nag Someswar Rao Jakka, Bargarh (IN); Anshuman Shukla, Mumbai (IN); Shrikrishna Vyankatesh Kulkarni, Mumbai (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 0 days.

(21) Appl. No.: 15/701,738

(22) Filed: Sep. 12, 2017

(65) Prior Publication Data

US 2018/0097361 A1    Apr. 5, 2018

(30) Foreign Application Priority Data

Oct. 4, 2016 (IN) .............................. 201621033871

(51) Int. Cl.
    *H02J 3/02*          (2006.01)
    *H02J 4/00*          (2006.01)
    *H02M 1/00*        (2006.01)

(52) U.S. Cl.
    CPC ................ *H02J 3/02* (2013.01); *H02J 4/00* (2013.01); *H02M 1/00* (2013.01)

(58) Field of Classification Search
    CPC ......... H02M 2001/0077; H02M 3/335; H02M 3/3353; H02M 5/458

USPC .............................................. 363/17, 37, 65
See application file for complete search history.

(56) References Cited

U.S. PATENT DOCUMENTS

| | | | | |
|---|---|---|---|---|
| 5,272,612 A * | 12/1993 | Harada | .................... | H02M 3/28 363/26 |
| 5,737,197 A * | 4/1998 | Krichtafovitch | .......... | B03C 3/68 363/17 |
| 5,991,173 A * | 11/1999 | Nishikawa | .............. | H02M 7/49 363/37 |
| 6,052,293 A * | 4/2000 | Ivner | ......................... | H02J 3/34 363/36 |
| 9,780,682 B2 * | 10/2017 | Keister | ................. | H02M 5/458 |
| 2004/0037092 A1 * | 2/2004 | Kurio | .................. | H02M 3/3376 363/17 |
| 2007/0139974 A1 * | 6/2007 | Aikawa | .............. | G03G 15/5004 363/16 |

(Continued)

*Primary Examiner* — Jeffrey Sterrett

(57) ABSTRACT

Embodiments herein provide an ACsDC converter for generating an ACsDC signal in which AC or DC source can be used to generate the ACsDC signal. The structure of the ACsDC converter consists of three stages, viz., input, isolation, and output. At the input stage, a DC voltage is converted to two AC voltages using power electronic converters. The isolation stage consists of transformers for isolating load and source terminals. The secondary voltages of the isolation transformers are used for obtaining the AC and DC components of the ACsDC signal. At the output stage, the AC component of the output voltage is obtained by using an AC-DC converter and a DC-AC converter. The magnitude, phase, and frequency of the AC component can be controlled. The magnitude of the DC component is controlled using a modulation technique. The AC and the DC component can be combined to obtain the ACsDC signal.

17 Claims, 17 Drawing Sheets

(56) References Cited

U.S. PATENT DOCUMENTS

| | | | |
|---|---|---|---|
| 2012/0062188 A1* | 3/2012 | Tanabe | H02M 7/48 |
| | | | 323/247 |
| 2015/0162845 A1* | 6/2015 | Lee | H02M 3/33569 |
| | | | 363/17 |
| 2016/0261205 A1* | 9/2016 | Kolar | H02M 5/458 |
| 2017/0023904 A1* | 1/2017 | Hakamada | G03G 15/80 |
| 2017/0299999 A1* | 10/2017 | Yoshikawa | G03G 15/80 |

* cited by examiner

APPARATUS FOR GENERATING AC SUPERIMPOSED DC SIGNAL

FIELD OF INVENTION

The embodiments herein relate to electronic convertors and more particularly to an apparatus for generating an AC Superimposed DC (ACsDC) signal. The present application is based on, and claims priority from an Indian Application Number 201621033871 filed on 4 Oct. 2016, the disclosure of which is hereby incorporated by reference.

BACKGROUND OF INVENTION

Power Electronics is one of the technologies which processes and controls electrical energy and supplies the desired form of electrical energy to the industrial as well as residential appliances. The desired form of electrical energy is achieved by using power electronic building blocks known as power electronic converters. The power electronic converters are primarily used for performing power conversion operations. The conventional power electronic converters perform the following power conversion operations viz., AC to AC conversion, AC to DC conversion, DC to AC conversion, and DC to DC conversion.

The power electronic converters with the aforementioned power conversions are commonly used in Switch Mode Power Supplies (SMPS), industrial drives, Flexible AC Transmission Systems (FACTS), High Voltage DC (HVDC) transmission systems, or the like. However, some of the applications such as power supplies for electric precipitator, devices featuring high viscosity developing agent, production of ultra-uniformly-sized silica particles, ozone generation, partial discharge analysis, or the like, require combined form of both AC power and DC power.

Existing AC transmission line can be upgraded to transmit AC Superimposed DC (ACsDC) signals. The upgrading of the AC transmission line is performed in order to transmit a large amount of power through the AC transmission line, while ensuring that the thermal limits are met. The applications in which high power transmission is required, the ACsDC signal, which is having a combination of AC power and DC power, is generated by using linear passive components such as combination of inductors, capacitors, resistors, transformers, or the like; or intransigent electronic devices. Some of these devices or systems which generate the ACsDC signal require both an AC source and a DC source for generating the ACsDC signal. The DC and AC components of the generated ACsDC signal are not flexible.

Thus, there is a need of having an apparatus which can generate an ACsDC signal which is having flexible AC and DC components; and can be generated from a single source, i.e., either AC source or DC source.

The above information is presented as background only to help the reader for understanding the present invention. Applicants have made no determination and make no assertion as to whether any of the above might be applicable as Prior Art with regard to the present application.

SUMMARY

The principal object of the embodiments herein is to provide an apparatus for generating an AC Superimposed DC (ACsDC) signal.

Another object of the embodiments herein is to provide flexibility in terms of controlling the magnitude of DC components and AC components of the ACsDC signal.

Another object of the embodiments herein is to allow generation of the ACsDC signal through an AC source or a DC source.

Another object of the embodiments herein is to allow generation of a high ACsDC signal.

Another object of the embodiments herein is to allow the modular connections of the proposed apparatus for generating ACsDC signals.

Accordingly embodiments herein provide an apparatus for generating an AC Superimposed DC (ACsDC) signal. In an embodiment, the apparatus includes an electronic converter for generating a first AC signal and a second AC signal, wherein a DC signal, derived from one of a DC source and an AC source fed to the electronic converter. The apparatus includes a first isolation transformer for generating a third AC signal and a second isolation transformer for generating a fourth AC signal. The first AC signal is fed to the first isolation transformer and the second AC signal is fed to the second isolation transformer. The apparatus includes a first AC-DC electronic converter for converting the third AC signal into a DC signal, wherein the third AC signal is derived from the first isolation transformer. The apparatus includes a DC-AC electronic converter for converting the DC signal obtained from the first AC-DC electronic converter into an AC component. The apparatus includes a second AC-DC electronic converter for converting the fourth AC signal into a DC component, wherein the fourth AC signal is derived from the second isolation transformer. The DC signal is generated by combining the AC component and the DC component.

In an embodiment, the apparatus includes an electronic converter for generating a first AC signal, wherein a DC signal derived from one of a DC source or an AC source is fed to the electronic converter. The apparatus includes an isolation transformer with a primary winding and a first secondary winding for generating a second AC signal and a second secondary winding for generating a third AC signal. The apparatus includes a first AC-DC electronic converter for converting the second AC signal into a DC signal, wherein the second AC signal is derived from the first secondary winding. The apparatus includes a DC-AC electronic converter for converting the DC signal obtained from the first AC-DC electronic converter into an AC component. The apparatus includes a second AC-DC electronic converter for converting the third AC signal into a DC component, wherein the third AC signal is derived by the second AC-DC electronic converter from the second secondary winding. The ACsDC signal is generated by combining the AC component and the DC component.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This method is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1A:
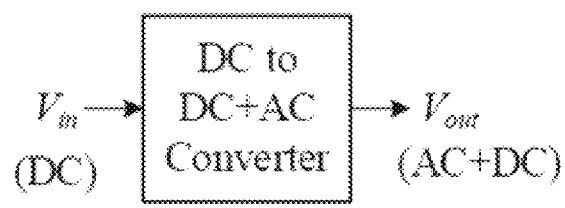
FIGS. 1a-1d illustrate existing devices for obtaining AC superimposed DC (ACsDC) signals, according to prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Accordingly embodiments herein provide an apparatus for generating an ACsDC signal. The proposed ACsDC converter can be used to generate the ACsDC signal from either an AC source or a DC source. The structure of the proposed ACsDC converter consists of three stages, viz., input stage, isolation stage, and output stage. In an embodiment, the proposed ACsDC converter can be used to generate the ACsDC signal from an AC source. In this instance, an additional AC-DC converter is used at the input stage to obtain the DC voltage from the AC source. At the input stage, a DC voltage is converted to two AC voltages using a single or multiple power electronic converters.

The isolation stage consists of transformers (isolation transformers) which play a crucial role in isolating the load and the source terminals. Further, in order to reduce the size and volume of the proposed ACsDC converter, high-frequency transformers are used at the isolation stage. As per the requirement of the load, the input AC voltages are stepped up or stepped down using the isolation transformers. The voltages at the secondary windings of the isolation transformers are used for obtaining the AC and DC components of the output ACsDC signal.

In the output stage, the AC component of the output voltage is obtained by using an AC-DC converter and a DC-AC converter. The AC-DC converter and the DC-AC converter are connected in cascade. As, the AC component of the ACsDC signal is obtained from through the DC-AC converter, the magnitude, phase, and frequency of the AC component can be easily controlled. The DC component of the ACsDC signal is obtained by using another AC-DC converter. The magnitude of the DC component can be controlled using an appropriate modulation technique. As the AC component and the DC component are isolated from each other through the isolation transformers, the AC component and the DC component can be combined to obtain the ACsDC signal.

Further, proposed apparatus includes a power electronic system which allows generating the ACsDC voltage from a single source where both AC and DC components can be independently controlled to meet the requirements of different applications.

Unlike conventional ACsDC converters, the proposed ACsDC converter allows utilizing power electronic converters for obtaining flexible AC and DC components, which constitute the generated ACsDC signal. The proposed ACsDC converter can be used for both high voltage as well as low voltage power applications. Further, the implementation of the proposed ACsDC converter is simple and is easy to adapt. The proposed ACsDC converter is having a reduced weight, reduced size and provides various power quality features.

The proposed ACsDC converter can be used in applications such as: power up gradation of existing AC transmission lines using ACsDC voltages, ozone generation, partial discharge measurements of dielectrics, electric precipitator, or the like. In an embodiment, the proposed ACsDC converter provides a power electronic system which can be used for generating an ACsDC signal consisting AC and DC components, which can be controlled as per the requirements.

Referring now to the drawings and more particularly to FIGS. 1 through 29, where similar reference characters denote corresponding features consistently throughout the figures, there are shown preferred embodiments.

FIGS. 1a-1d illustrate existing devices for obtaining ACsDC signals, according to prior art.

There are many applications which require the combination of AC and DC signals for their operation and power electronics provides electronic converters, which allow generating ACsDC signals. The power electronic converters used for obtaining ACsDC signals from a single source, i.e., either AC or DC, are illustrated in the FIGS. 1a-1d.

Figure 1B:
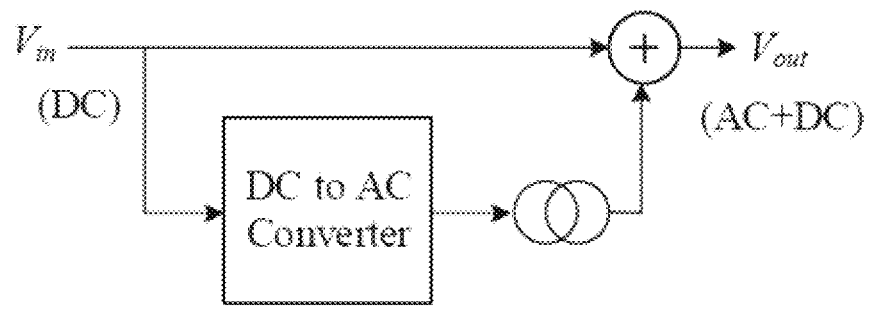
Figure 1C:
Figure 1D:
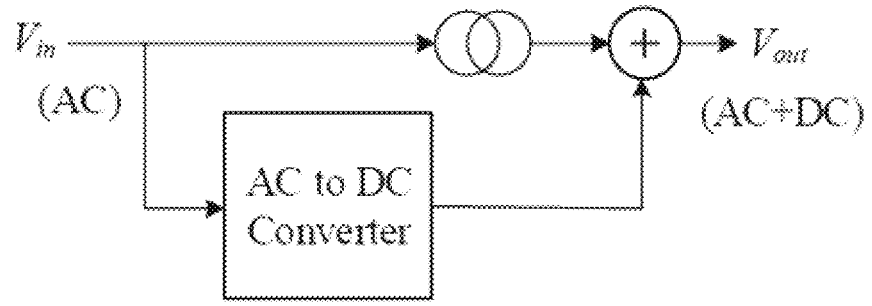

The simplest circuit for generating the ACsDC signal utilizes one power electronic converter in which ACsDC voltage is obtained by using appropriate switching combinations and control techniques, as depicted in FIG. 1a and FIG. 1c. Although the structures of the configurations as depicted in FIG. 1a and FIG. 1c are simple, the output ACsDC signal includes comparatively higher harmonics which lead to complex filter circuitry and it is not isolated from the input.

As depicted in FIG. 1b, the combined form of AC component and DC component is obtained by using a transformer and a DC to AC converter. In this topology, the output ACsDC signal is having flexibility in terms of magnitude and frequency of the AC component. However, the output is not completely isolated from the input. Similarly, in FIG. 1d, the combined form of AC component and DC component is obtained from an AC source using a transformer and an AC-DC converter. In this case, the AC component does not have the flexibility in terms of frequency of the AC component. Therefore, such topologies cannot be used where the required AC component frequency is different from the source frequency. Additionally, the input and output terminals are not isolated in this structure.

In recent years, the conventional line frequency transformers of many power electronic systems are being replaced with high-frequency transformers in order to reduce the size and weight of the overall structure. Therefore, the primary focus of the embodiments is to develop a compact structured power electronic system in which an ACsDC signal is obtained from a single source. The AC and DC components of the output ACsDC signal are flexible and the output is isolated from the input.

Figure 2:
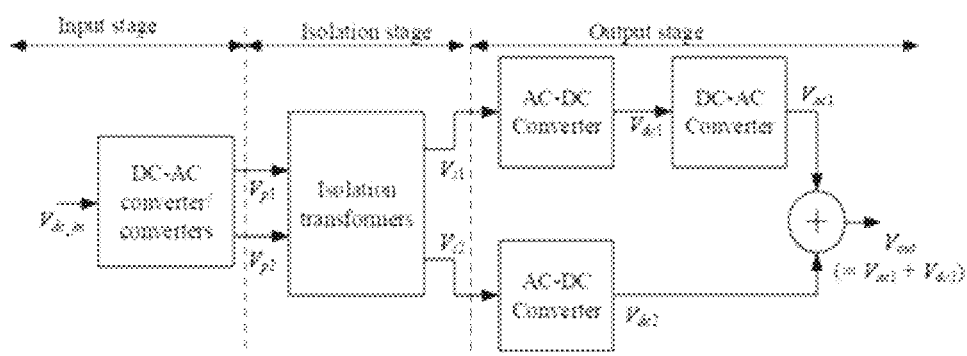
FIG. 2 is a block diagram illustrating the proposed ACsDC converter, according to an embodiment as disclosed herein.

FIG. 2 is a block diagram illustrating the proposed ACsDC converter, according to an embodiment as disclosed herein.

The block diagram of one of the embodiments of the proposed ACsDC converter, as depicted in FIG. 2, can be used for generating an ACsDC signal from the DC source. The structure of ACsDC converter comprises of three stages, viz., input, isolation, and output. In the input stage, the input DC voltage ($V_{dc\_in}$) is converted to AC voltages ($V_{p1}$ and $V_{p2}$) using a single or multiple power electronic converters. The isolation stage consists of transformers which play a crucial role in isolating the load and source terminals. In order to reduce the size and volume of the proposed system, high-frequency transformers are recommended to be used at the isolation stage. The input voltages ($V_{p1}$ and $V_{p2}$), fed to the primary windings of the isolation transformers, are either stepped up or stepped down through the isolation transformers according to load requirement.

The voltages at secondary windings of the isolation transformers ($V_{s1}$ and $V_{s2}$) are used to obtain the AC and DC components of the output ACsDC signal. In the output stage, the AC component of the ACsDC signal ($V_{ac1}$) is obtained by using a back to back connection of AC-DC and DC-AC converters. As $V_{ac1}$ is obtained from $V_{dc1}$ using the DC-AC converter, the magnitude, phase, and frequency of $V_{ac1}$ can be easily controlled. The DC component of the ACsDC signal ($V_{dc2}$) is obtained through the AC-DC converter. The magnitude of $V_{dc2}$ can be controlled by using an appropriate modulation technique. As the voltages $V_{ac1}$ and $V_{dc2}$ are isolated from each other through the isolation transformers, they are combined to obtain the output ACsDC voltage ($V_{out}$) consisting of both AC and DC components.

Figure 3:
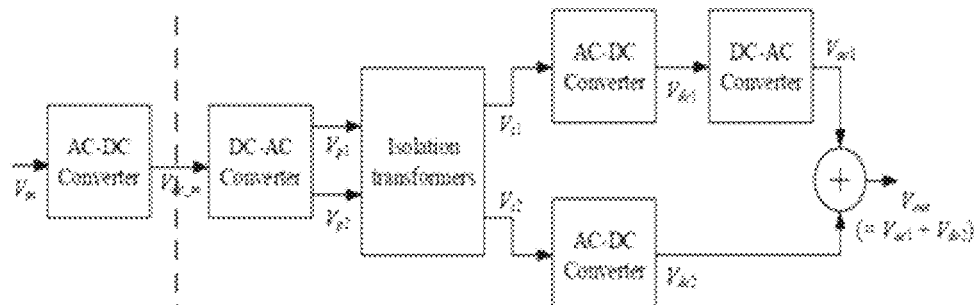
FIG. 3 is a block diagram illustrating the proposed ACsDC converter with an additional AC-DC converter at the input stage, according to an embodiment as disclosed herein.

FIG. 3 is a block diagram illustrating the proposed ACsDC converter with an additional AC-DC converter at the input stage, according to an embodiment as disclosed herein.

In an embodiment, the proposed ACsDC converter can also be used to generate ACsDC signal from an AC source, as depicted in FIG. 3. An additional AC-DC converter is used at the input stage to obtain the DC voltage ($V_{dc\_in}$) from the AC source. From the obtained DC voltage, the ACsDC voltage ($V_{out}$) with AC and DC components are obtained as that of the embodiment depicted in the FIG. 2.

Figure 4:
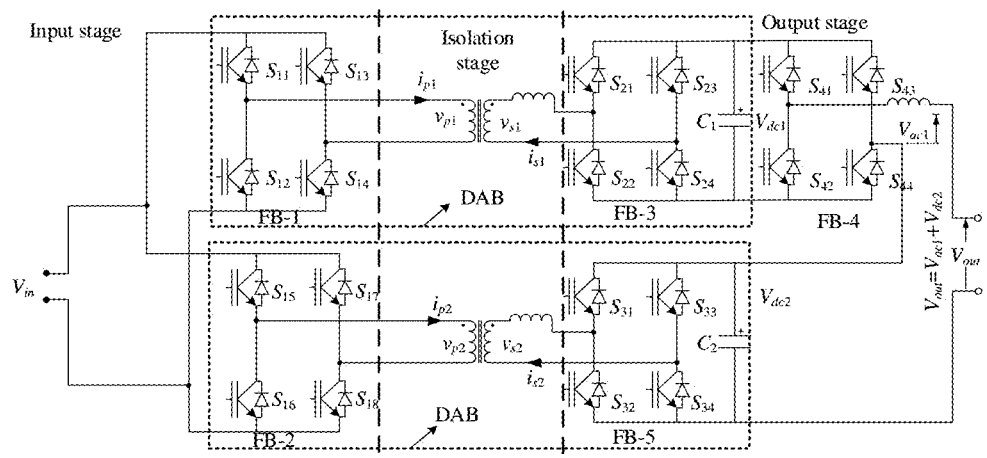
FIG. 4 illustrates a circuit diagram of a Dual port Active Bridge (DAB) based ACsDC converter, according to an embodiment as disclosed herein.

FIG. 4 illustrates a circuit diagram of Dual port Active Bridge (DAB) based ACsDC converter, according to an embodiment as disclosed herein.

The structure of the embodiment (depicted in FIG. 4) consists of three stages, viz., input, isolation, and output. The input stage consists of two Full Bridge (FB) converters, i.e., FB-1 and FB-2, whose DC-side terminals are connected in parallel. The FB-1 and FB-2 collectively form the electronic converter at the input stage. The FB-1 generates the first AC signal and the FB-2 generates the second AC signal.

The output terminals of FB-1 and FB-2 are connected to the primary windings of the isolation stage transformers. The output terminal of FB-1 is connected to the primary winding of the first isolation transformer. The output terminal of FB-2 is connected to the primary winding of the second isolation transformer. The output stage of the DAB based ACsDC converter consists of three FB converters. FB converters are used as AC-DC and DC-AC converters to implement the proposed ACsDC converter for generating the output ACsDC voltage. It is to be noted that other possible converters can also be used to carry out AC-DC and DC-AC power conversions.

Two FB converters, viz., FB-3 and FB-4, are used to convert the voltage of the secondary winding of the first isolation transformer into the desired AC component ($V_{ac1}$) of the output ACsDC voltage. The FB-3 is the first AC-DC electronic converter. The FB-4 is the DC-AC electronic converter. The secondary winding of the first isolation transformer, which generates the third AC signal, is connected to the input terminal of FB-3. The secondary winding of the second isolation transformer, which generates the fourth AC signal, is connected to the input terminal of FB-5. The FB-5 is the second AC-DC electronic converter. The FB-5 converter, at the output stage, is used to obtain the DC component ($V_{dc2}$) of the output ACsDC voltage. The two components, i.e., $V_{ac1}$ and $V_{dc2}$ are connected in series to obtain the output ACsDC voltage ($V_{out}$).

As both the AC component and the DC component are isolated using two different isolation transformers, the associated converters can be operated to generate wide range of phase delay between the transformer winding voltages to achieve a large output ACsDC voltage. The combination of FB converters at the input stage, isolation transformer at the isolation stage, and FB converters at the output stage; are collectively called as DAB converter. Therefore, this embodiment of the proposed ACsDC converter is named as DAB based ACsDC converter.

Figure 5:
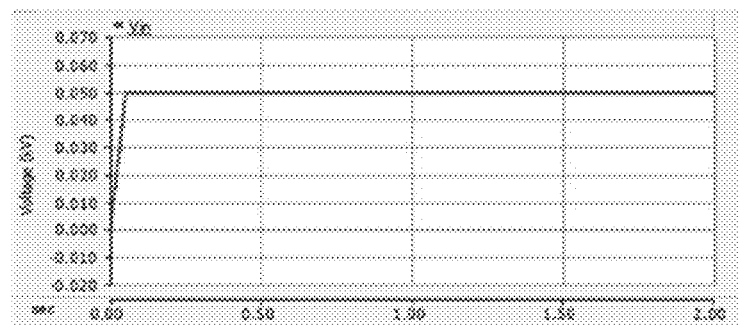
FIG. 5 is a graph depicting input voltage of the DAB based ACsDC converter, according to an embodiment as disclosed herein.

FIG. 5 is a graph depicting input voltage of the DAB based ACsDC converter, according to an embodiment as disclosed herein.

Input voltage ($V_{in}$) is applied to the DAB based ACsDC converter. The input voltage is maintained at 50 V.

Figure 6:
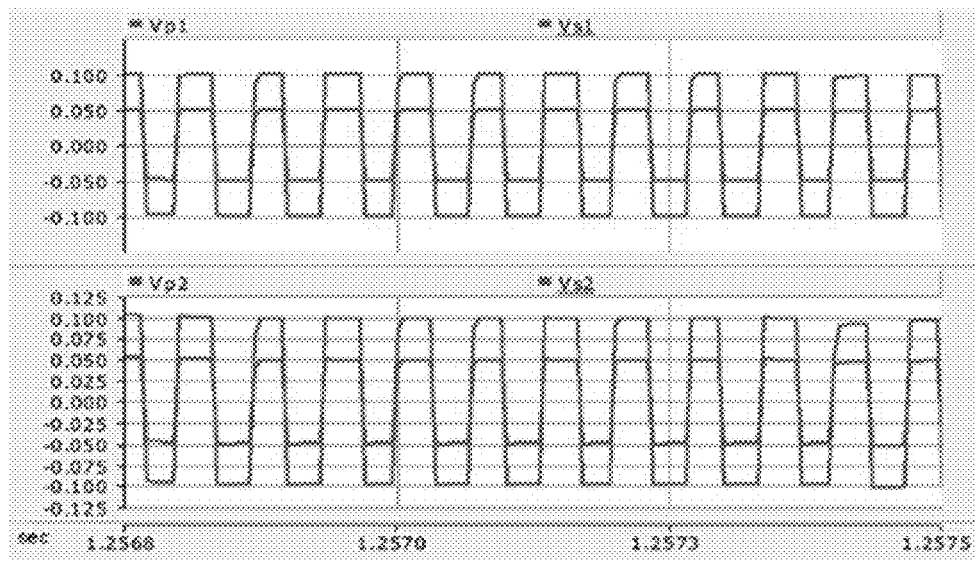
FIG. 6 is a graph depicting voltages at primary and secondary windings of the first and second isolation stage transformers, of the DAB based ACsDC converter, according to an embodiment as disclosed herein.

FIG. 6 is a graph depicting voltages at primary and secondary windings of the first and second isolation stage transformers, of the DAB based ACsDC converter, according to an embodiment as disclosed herein.

The voltages at the primary windings and at the secondary windings of the first and second isolation stage transformers, i.e., $V_{p1}$ (first AC signal), $V_{p2}$ (second AC signal), $V_{s1}$ (third AC signal), and $V_{s2}$ (fourth AC signal); are depicted in the FIG. 6. It can be observed from FIG. 6, that the primary and secondary voltages are maintained at a ratio of 1:2.

Figure 7:
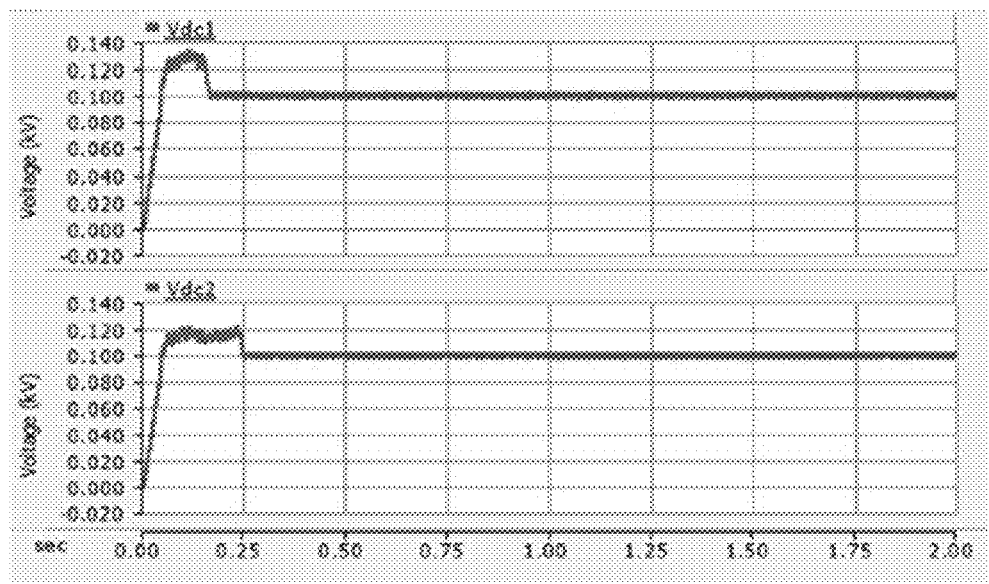
FIG. 7 is a graph depicting DC voltages at output stage of the DAB based ACsDC converter, according to an embodiment as disclosed herein.

FIG. 7 is a graph depicting DC voltages at output stage of the DAB based ACsDC converter, according to an embodiment as disclosed herein.

The DC voltages ($V_{dc1}$ and $V_{dc2}$) at the output stage are depicted in FIG. 7. The voltage $V_{dc2}$ is the DC component of the ACsDC signal. The PS-PWM technique is used for maintaining the DC voltages at around 100 V.

Figure 8:
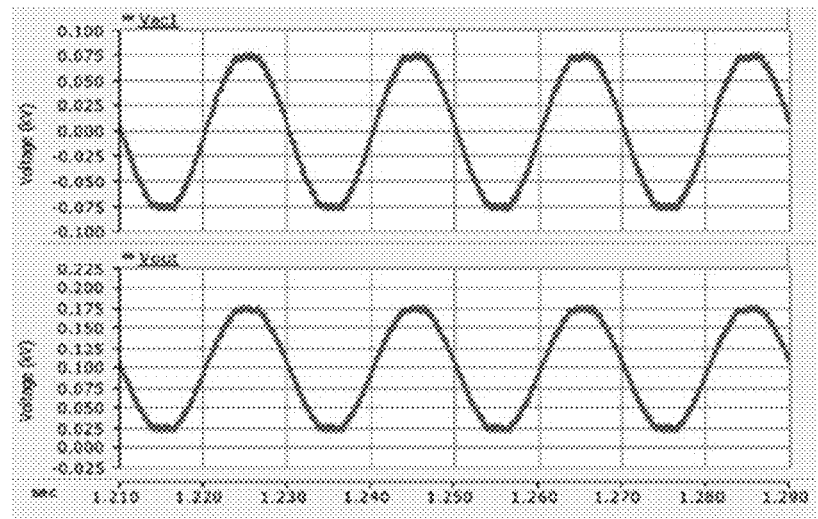
FIG. 8 is a graph depicting AC component voltage and the output ACsDC signal voltage at output stage of the DAB based ACsDC converter, according to an embodiment as disclosed herein.

FIG. 8 is a graph depicting AC component voltage and the output ACsDC signal voltage at output stage of the DAB based ACsDC converter, according to an embodiment as disclosed herein.

The AC component ($V_{ac1}$) of the ACsDC signal and the output ACsDC voltage ($V_{out}$) are depicted in FIG. 8. The results in FIGS. 5-8 validate the operation of the proposed DAB based ACsDC converter.

Figure 9:
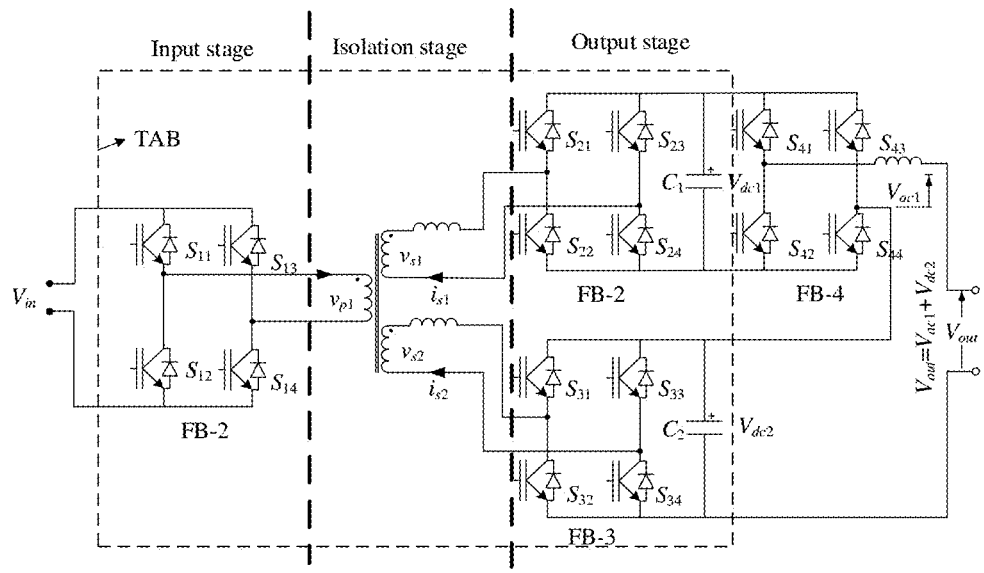
FIG. 9 illustrates a circuit diagram of a Triple port Active Bridge (TAB) based ACsDC converter, according to an embodiment as disclosed herein.

FIG. 9 illustrates a circuit diagram of Triple Port Active Bridge (TAB) based ACsDC converter, according to an embodiment as disclosed herein.

In another embodiment of the proposed ACsDC converter, the DC voltages at the output stage, i.e., $V_{dc1}$ and $V_{dc2}$, are obtained using a TAB; as depicted in FIG. 9. The embodiment requires a reduced number of semiconductor switches in the input stage and a single three-winding transformer instead of two transformers in the isolation stage, as compared to DAB based ACsDC converter, which makes the overall ACsDC converter compact. At the input stage, the electronic converter consists of one FB converter (FB-1). The FB-1 generates the first AC signal ($V_{p1}$), which is fed to the primary winding of the isolation transformer. The isolation transformer consists of one primary winding and two secondary windings. The first secondary winding generates a second AC signal ($V_{s1}$) and a second secondary winding for generating a third AC signal ($V_{s2}$).

As all windings are wound on a common core, the converters cannot be operated to have wider differences of phase delays between the transformer winding voltages, which limits the range and flexibility of the components of the output voltage.

The operation of output stage of the TAB based ACsDC converter is identical to that of the DAB based ACsDC converter, discussed in FIG. 4. The functionality of the FB-3, FB-4, and FB-5 in FIG. 4 is performed by the FB-2, FB-4, and FB-3 respectively, in FIG. 9.

Figure 10:
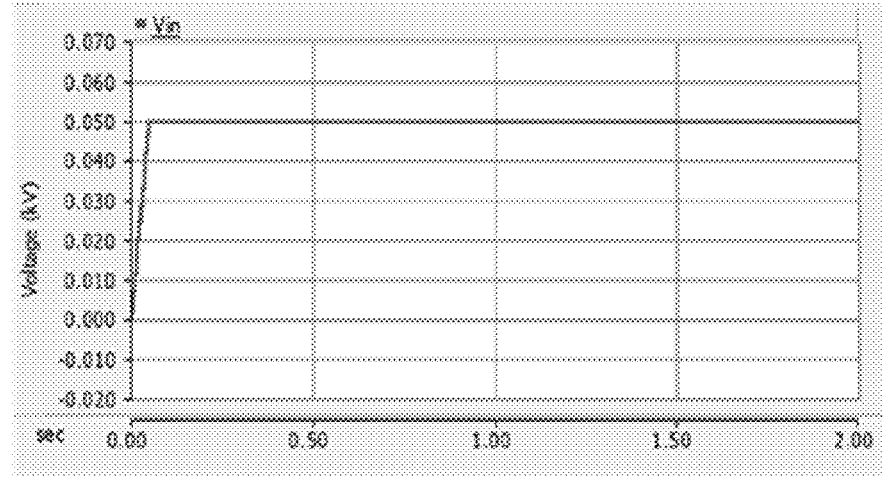
FIG. 10 is a graph depicting input voltage of the TAB based ACsDC converter, according to an embodiment as disclosed herein.

FIG. 10 is a graph depicting input voltage of the TAB based ACsDC converter, according to an embodiment as disclosed herein.

Input voltage ($V_{in}$) is applied to the TAB based ACsDC converter. The input voltage is maintained at 50 V.

Figure 11:
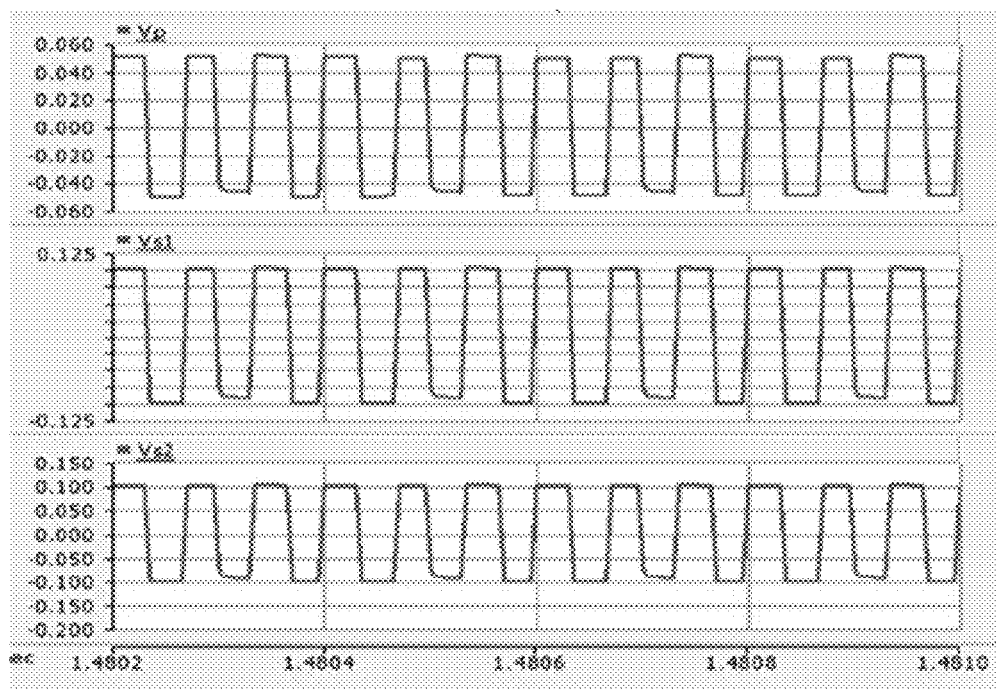
FIG. 11 is a graph depicting voltages at primary and secondary windings, of isolation stage transformer of the TAB based ACsDC converter, according to an embodiment as disclosed herein.

FIG. 11 is a graph depicting voltages at primary and secondary windings, of the isolation stage transformer, of the TAB based ACsDC converter, according to an embodiment as disclosed herein.

The voltages at the primary winding and at the two secondary windings (first secondary winding and second secondary winding) of the isolation stage transformer, i.e., $V_{p1}$ (first AC signal), $V_{s1}$ (second AC signal), and $V_{s2}$ (third AC signal); are depicted in FIG. 11. It can be observed from FIG. 11, that the primary and secondary voltages are maintained at a ratio of 1:2.

Figure 12:
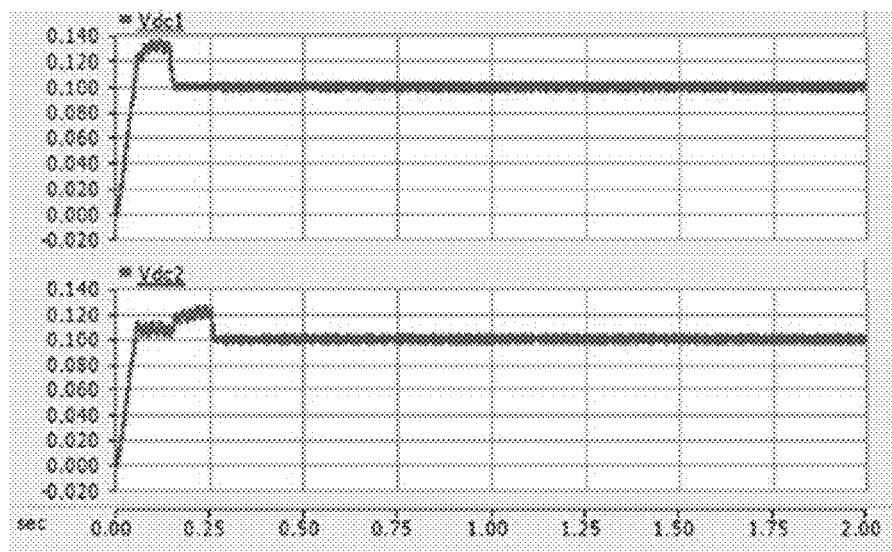
FIG. 12 is a graph depicting DC voltages at output stage of the TAB based ACsDC converter, according to an embodiment as disclosed herein.

FIG. 12 is a graph depicting the DC voltages at output stage of the TAB based ACsDC converter, according to an embodiment as disclosed herein.

In an embodiment, the output stage DC voltages ($V_{dc1}$ and $V_{dc2}$) are shown in the FIG. 12. The FIG. 12 depicts that the PS-PWM technique is able to maintain the DC voltages at 100 V.

The DC voltages ($V_{dc1}$ and $V_{dc2}$) at the output stage of the TAB based ACsDC converter is depicted in FIG. 12. The voltage $V_{dc2}$ is the DC component of the ACsDC signal. The PS-PWM technique is used for maintaining the DC voltages at around 100 V.

Figure 13:
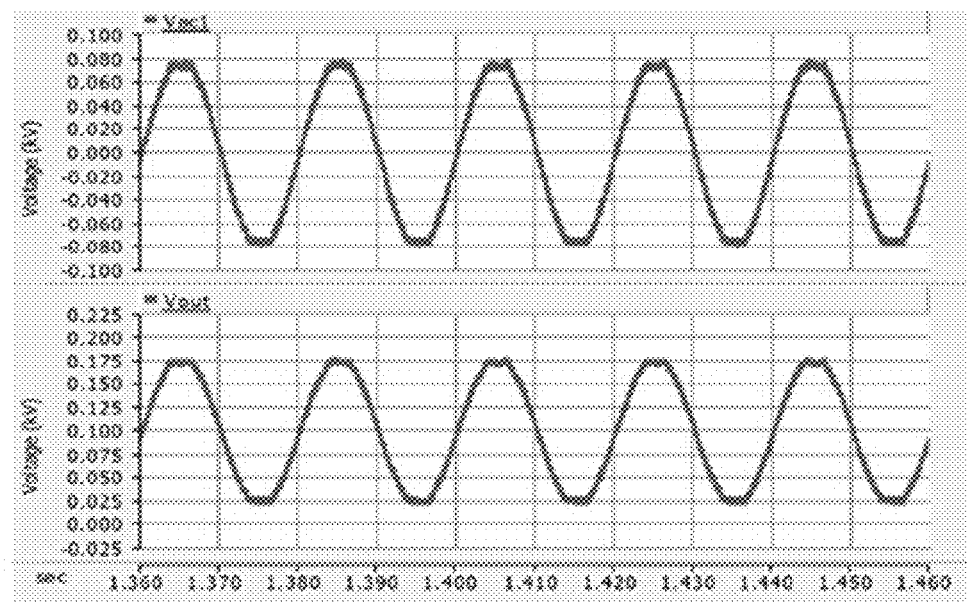
FIG. 13 is a graph depicting AC component voltage and the output ACsDC signal voltage at output stage of the DAB based ACsDC converter, according to an embodiment as disclosed herein.

FIG. 13 is a graph depicting AC component voltage and output ACsDC signal voltage at output stage of the DAB based ACsDC converter, according to an embodiment as disclosed herein.

The AC component ($V_{ac1}$) of the ACsDC signal and the output ACsDC voltage ($V_{out}$) are depicted in FIG. 13. The results in FIGS. 10-13 validate the operation of the proposed TAB based ACsDC converter.

Figure 14:
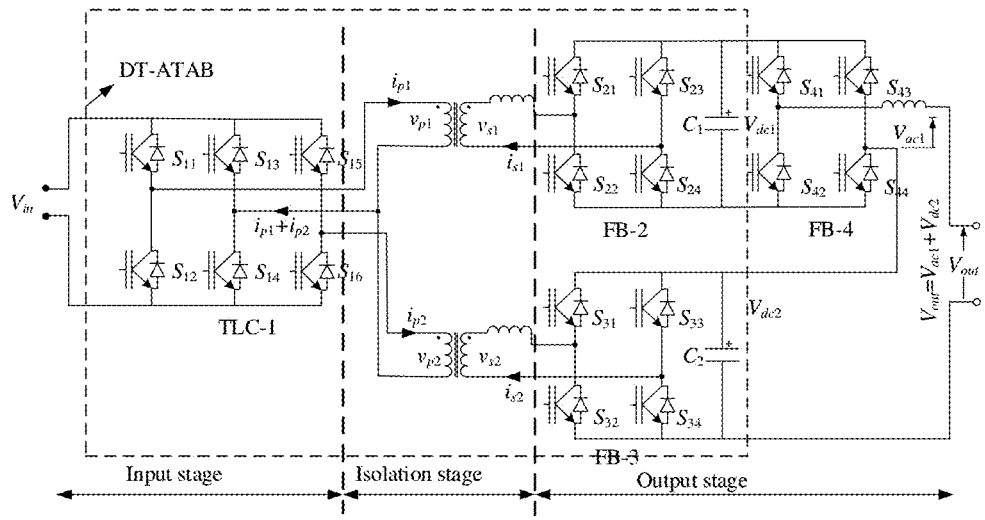
FIG. 14 illustrates a circuit diagram of a Dual Transformer based Asymmetrical Triple-Port Active Bridge (DT-ATAB) based ACsDC converter, according to an embodiment as disclosed herein.

FIG. 14 illustrates a circuit diagram of Dual Transformer based Asymmetrical Triple-Port Active Bridge (DT-ATAB) based ACsDC converter, according to an embodiment as disclosed herein.

In another embodiment of the proposed ACsDC converter, for obtaining ACsDC voltage, the input voltage is obtained from a DC source; as depicted in the FIG. 14. Here the DC-voltages at the output stage, viz., $V_{dc1}$ and $V_{dc2}$, are obtained from the DC source by using a dual transformer based DT-ATAB converter. The input stage of the DT-ATAB based ACsDC converter consists of an electronic converter. The electronic converter is a Three Leg Converter (TLC-1). The isolation stage of the DT-ATAB based ACsDC converter consists of two transformers. The output stage consists of two AC-DC electronic converters (FB-2 and FB-3) and one DC-AC electronic converter (FB-4). The functionality (input stage, isolation stage, and output stage) of this embodiment is identical to that of FIG. 4. The operation of the FB-3, FB-4, and FB-5 in FIG. 4 is performed by the FB-2, FB-4, and FB-3 respectively in FIG. 14. The embodiment of FIG. 14 consists of lower number of switches as compared to the embodiment of the FIG. 4, and allows operating the associated FB converters in a wide range of phase delays (between the transformer winding voltages). This allows having flexible AC and DC components in the output ACsDC voltage. The output voltage is obtained in a similar manner as the FIG. 4.

The discussed embodiments in the FIG. 4, FIG. 9, and FIG. 14, can be considered as basic circuits of ACsDC converters. All these converters can also be used to obtain the ACsDC signal from the AC source by using an extra AC-DC converter as depicted in the FIG. 3.

Figure 15:
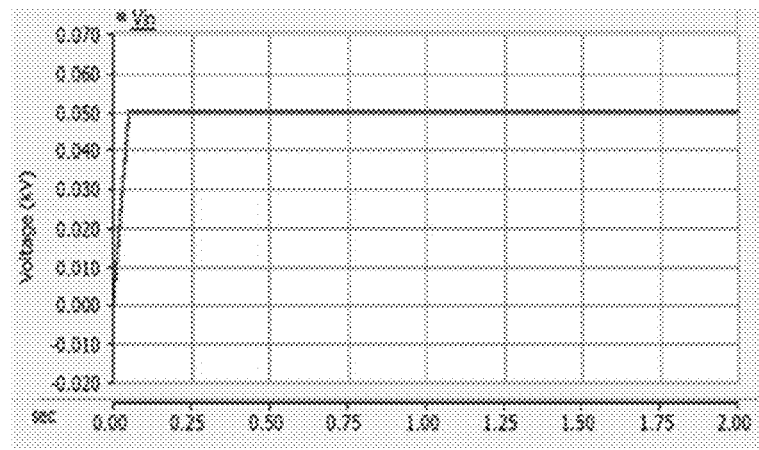
FIG. 15 is a graph depicting input voltage of the DT-ATAB based ACsDC converter, according to an embodiment as disclosed herein.

FIG. 15 is a graph depicting input voltage of the DT-ATAB based ACsDC converter, according to an embodiment as disclosed herein.

Input voltage ($V_{in}$) is applied to the DT-ATAB based ACsDC converter. The input voltage is maintained at 50 V.

Figure 16:
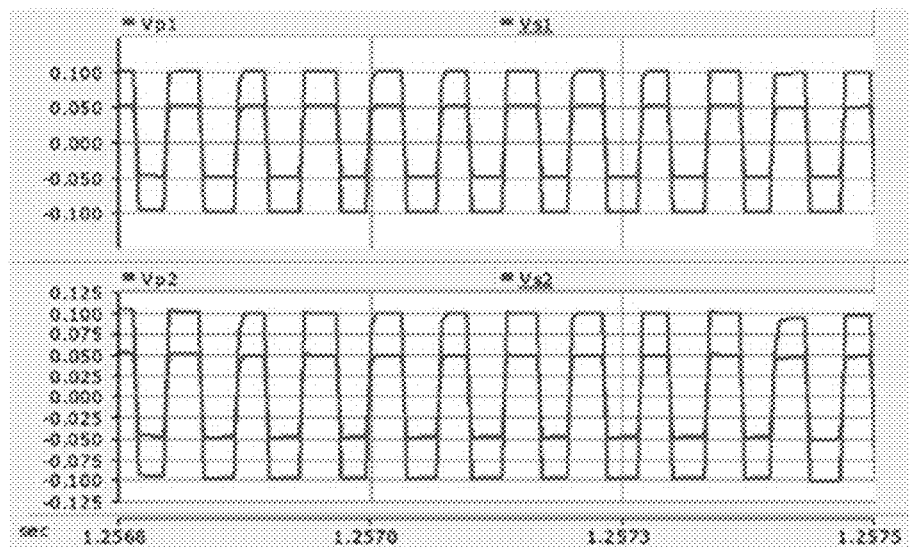
FIG. 16 is a graph depicting voltages at primary and secondary windings, of isolation stage transformers of the DT-ATAB based ACsDC converter, according to an embodiment as disclosed herein.

FIG. 16 is a graph depicting voltages at primary and secondary windings, of isolation stage transformers of the DT-ATAB based ACsDC converter, according to an embodiment as disclosed herein.

The voltages at the primary windings and at the secondary windings of the first and second isolation stage transformers, i.e., $V_{p1}$ (first AC signal), $V_{p2}$ (second AC signal), $V_{s1}$ (third AC signal), and $V_{s2}$ (fourth AC signal); are depicted in the FIG. 16. It can be observed from FIG. 16, that the primary and secondary voltages are maintained at a ratio of 1:2.

Figure 17:
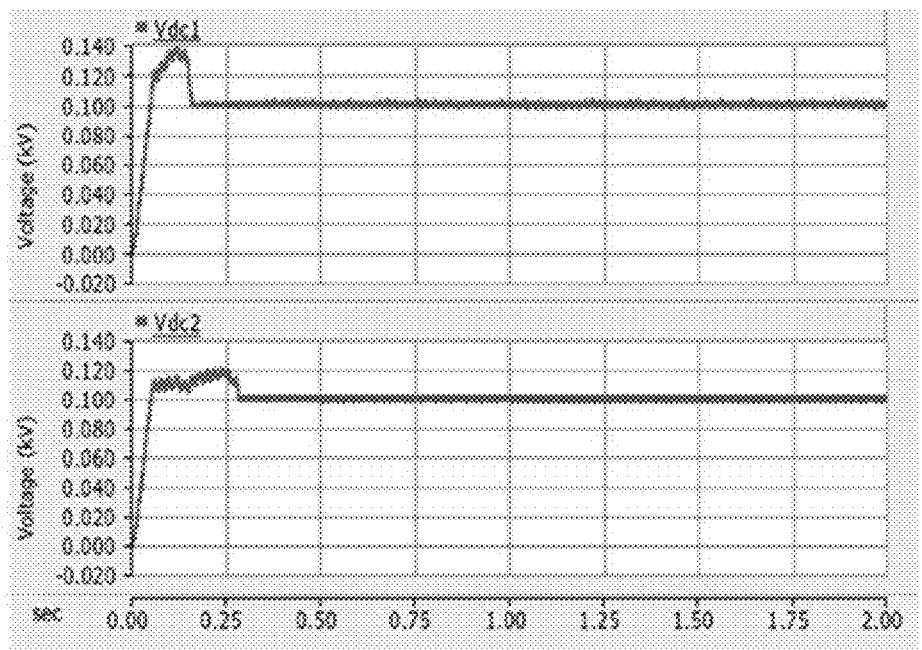
FIG. 17 is a graph depicting DC voltages at output stage of the DT-ATAB based ACsDC converter, according to an embodiment as disclosed herein.

FIG. 17 is a graph depicting DC voltages at output stage of the DT-ATAB based ACsDC converter, according to an embodiment as disclosed herein.

The DC voltages ($V_{dc1}$ and $V_{dc2}$) at the output stage are depicted in FIG. 17. The voltage $V_{dc2}$ is the DC component of the ACsDC signal. The PS-PWM technique is used for maintaining the DC voltages at around 100 V.

Figure 18:
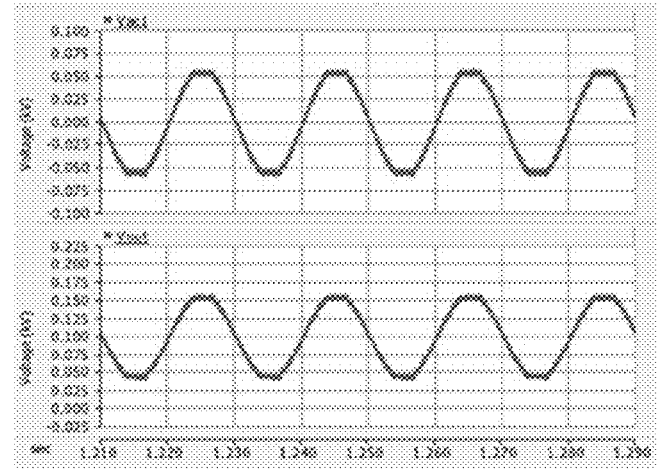
FIG. 18 is a graph depicting AC component voltage and the output ACsDC signal voltage at output stage of the DT-ATAB based ACsDC converter, according to an embodiment as disclosed herein.

FIG. 18 is a graph depicting AC component voltage and the output ACsDC component voltage at output stage of the DT-ATAB based ACsDC converter, according to an embodiment as disclosed herein.

The AC component ($V_{ac1}$) of the ACsDC signal and the output ACsDC voltage ($V_{out}$) are depicted in FIG. 18. The results in FIGS. 15-18 validate the operation of the proposed DT-ATAB based ACsDC converter.

Figure 19:
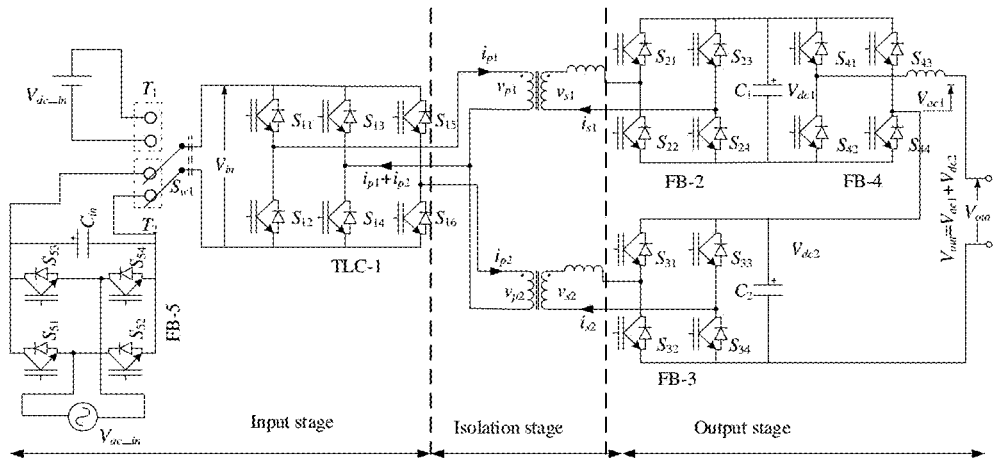
FIG. 19 illustrates a circuit diagram of an extended DT-ATAB based ACsDC converter for an AC source, according to an embodiment as disclosed herein.

FIG. 19 illustrates a circuit diagram of an extended DT-ATAB based ACsDC converter for an AC source, according to an embodiment as disclosed herein.

In another embodiment of the proposed ACsDC converter, for obtaining ACsDC voltage, the input voltage is obtained from the DT-ATAB based ACsDC converter with an AC source or DC source; as depicted in the FIG. 19. The input stage consists of a DC source and an AC source. A switch is used for feeding a DC signal from either an AC voltage source or a DC voltage source. In this topology, the voltage ($V_{in}$) at the input stage, if obtained from the AC source, is fed to an AC-DC converter (FB-5). The FB-5 converts the AC voltage into the appropriate input DC voltage ($V_{in}$). The functionality of this embodiment is identical to that of the embodiment depicted in FIG. 14.

Figure 20:
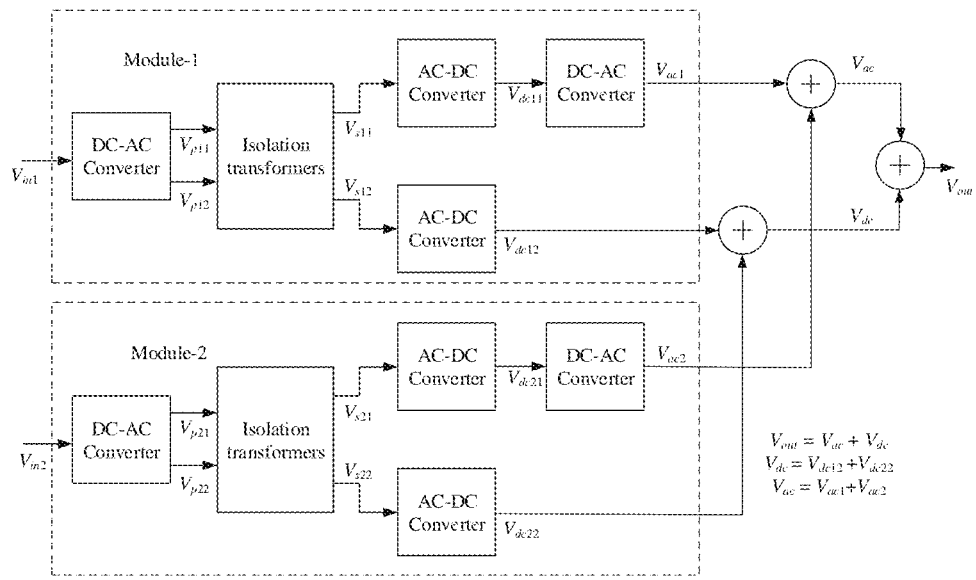
FIG. 20 illustrates a block diagram of a cascaded ACsDC converter, according to an embodiment as disclosed herein.

FIG. 20 illustrates a block diagram of a cascaded ACsDC converter, according to an embodiment as disclosed herein.

The proposed ACsDC converters can be cascaded to achieve higher voltage levels at the output. The block diagram of the cascaded ACsDC converter is depicted in the FIG. 20. Two different ACsDC modules, viz., module-1 and module-2, are used for obtaining the cascaded output. The AC components at the output stage of module-1 and module-2, i.e., $V_{ac1}$ and $V_{ac2}$, are connected in series to obtain a cascaded H-bridge converter for generating a multilevel AC voltage component ($V_{ac}$). Cascaded H-Bridge converter topology (obtained due to series connection) offers multilevel AC voltage for the AC component and improves the harmonic profile of the AC component. Similarly, the AC components of DC voltages of the output stage of module-1 and module-2, viz. $V_{dc12}$ and $V_{dc22}$, are connected in series to obtain the higher voltage level DC component ($V_{dc}$). The resultant output ACsDC voltage of the overall structure is achieved by combining $V_{ac}$ and $V_{dc}$ in series.

Figure 21:
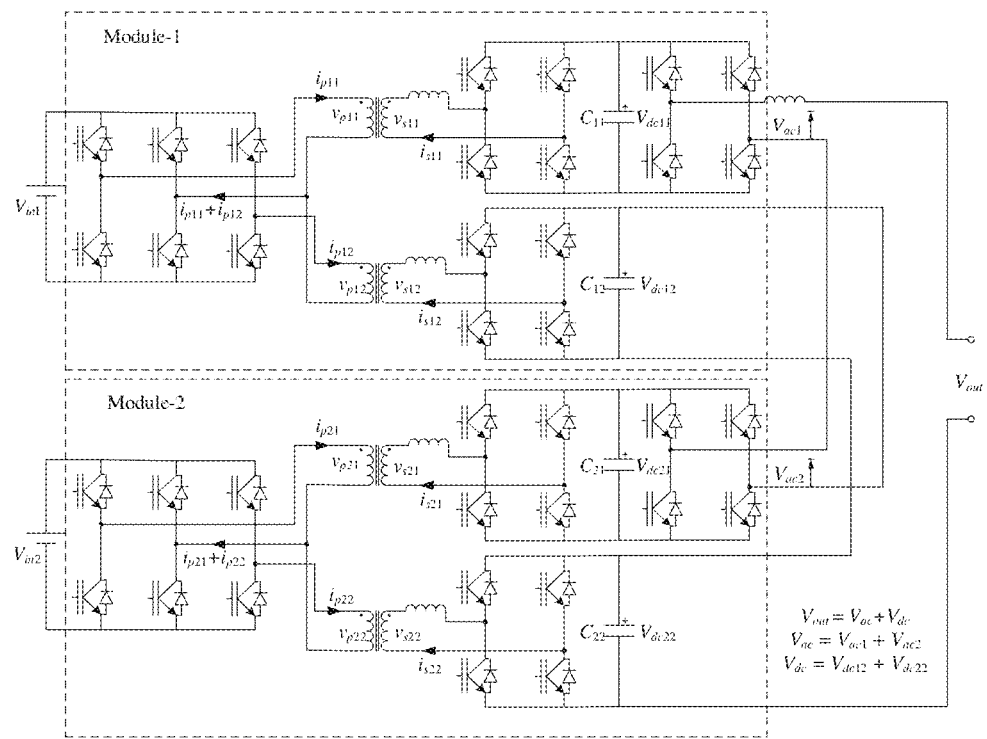
FIG. 21 illustrates a circuit diagram of the cascaded ACsDC converter for offering high voltage ACsDC signal, according to an embodiment as disclosed herein.

FIG. 21 illustrates a circuit diagram of the cascaded ACsDC converter for offering high voltage ACsDC signal, according to an embodiment as disclosed herein.

The embodiments of the proposed ACsDC converter, viz., FIG. 4, FIG. 9, FIG. 14, FIG. 19, can be connected in cascaded. In an example, the cascaded structure of DT-ATAB based ACsDC converter is depicted in FIG. 21. Likewise, further modules can be added to obtain higher levels of the output ACsDC voltage.

Figure 22:
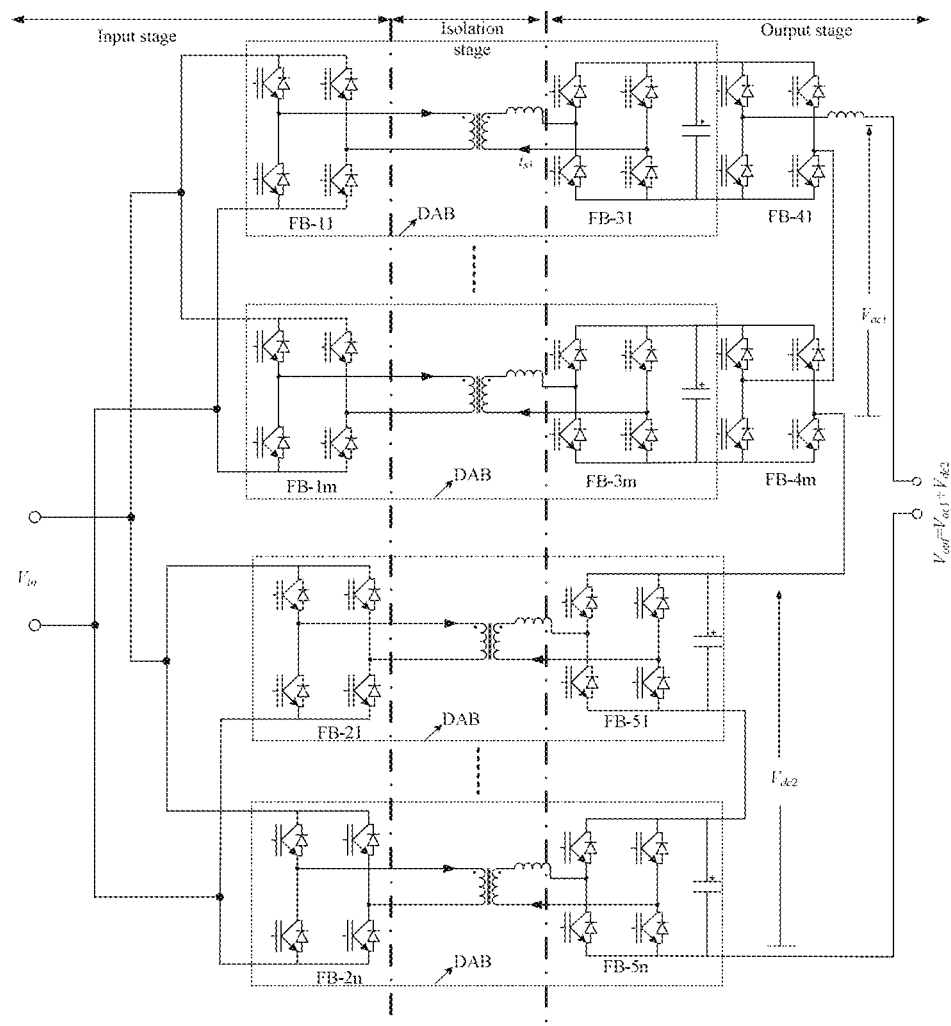
FIG. 22 illustrates a topology derived from the DAB based ACsDC converter, according to an embodiment as disclosed herein.

FIG. 22 illustrates a topology derived from the DAB based ACsDC converter, according to an embodiment as disclosed herein.

An embodiment of the proposed ACsDC converter, derived from the DAB based ACsDC converter, depicted in FIG. 4, for obtaining ACsDC voltage is depicted in FIG. 22. In this topology, 'm+n' number of DABs are used for obtaining the superimposed ACsDC voltage. The input stage consists of an electronic converter for generating a first set of AC signals and a second set of AC signals. There are 'm' AC signals in the first set of AC signals generated by the FB converters FB-11 to FB-1m. There are 'n' AC signals in the second set of AC signals generated by the FB converters FB-21 to FB-2n.

The isolation stage consists of a first set and a second set of isolation transformers. The input to the primary winding of each of the first set of isolation transformers is one AC signal amongst the 'm' AC signals. Each isolation transformer in the first set of isolation transformers generates an AC signal at its secondary winding. The first set of isolation transformers generates a third set of AC signals. The input to the primary winding of each of the second set of isolation transformers is one AC signal amongst the 'n' AC signals. Each isolation transformer in second set of isolation transformers generates an AC signal at its secondary winding. The second set of isolation transformers generates a fourth set of AC signals.

The output stage consists of a first set of AC-DC converters, FB-31 to FB-3m, a second set of AC-DC converters, FB-51 to FB-5n, and a set of DC-AC converters, FB-41 to FB-4m. The first set of AC-DC electronic converters converts the third set of AC signals into a set of DC signals. Each AC signal, amongst the third set of AC signals, is fed to each AC-DC electronic converter, amongst the first set of AC-DC electronic converters. The second set of AC-DC electronic converters converts the fourth set of AC signals into a DC component ($V_{dc2}$). Each AC signal, amongst the fourth set of AC signals, is fed to each AC-DC electronic converter, amongst the second set of AC-DC electronic converters. The set of DC-AC electronic converters converts the set of DC signals into an AC component ($V_{ac1}$). Each DC-AC electronic converter, amongst the set of DC-AC converters, obtains a DC signal, amongst the set of DC signals.

As depicted in FIG. 22, 'm' DABs along with 'm' full bridge converters (FB-41 to FB-4m), are used for obtaining AC component ($V_{ac1}$) of the output ACsDC voltage. The remaining 'n' DABs are used for obtaining the DC component ($V_{dc2}$) of the output ACsDC voltage. The AC and DC components are combined to obtain the output ACsDC signal ($V_{out}$). The inputs to the DABs are connected in parallel across the input source ($V_{in}$). The values of 'm' and 'n' can be selected as per the requirement of the DC and AC components of the output ACsDC voltage. This embodiment of the proposed ACsDC converter is useful for high voltage operations.

Figure 23:
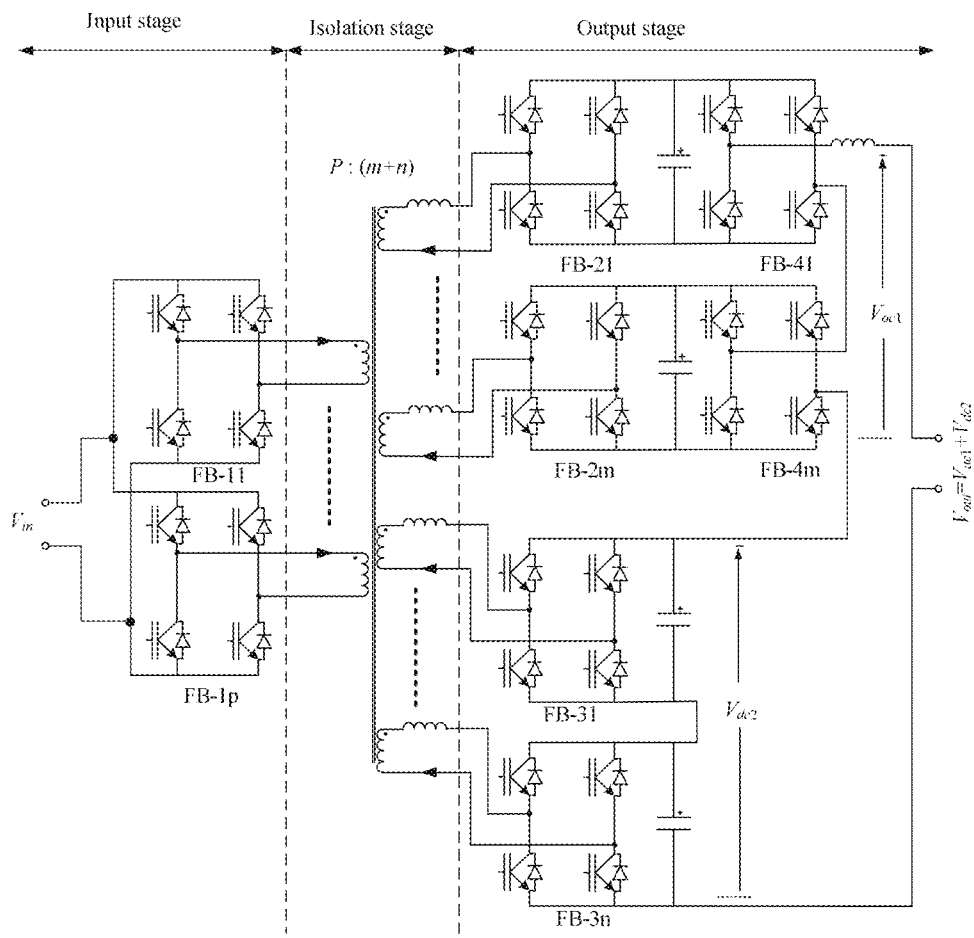
FIG. 23 illustrates a topology derived from the TAB based ACsDC converter, according to an embodiment as disclosed herein.

FIG. 23 illustrates a topology derived from the TAB based ACsDC converter, according to an embodiment as disclosed herein.

An embodiment of the proposed ACsDC converter, derived from the TAB based ACsDC converter, depicted in FIG. 9, for obtaining ACsDC voltage is depicted in FIG. 23. The embodiment allows generating ACsDC voltage using a multi-port electronic converter and a multi-winding transformer in its isolation stage. The input stage consists of an electronic converter for generating a first set of AC signals. The electronic converter consists of 'p' FB converters, i.e., FB-11 to FB-1p, in which each FB converter generates an AC signal amongst the 'p' AC signals (first set).

The isolation stage consists of one isolation transformer in which there are 'p' number of primary windings and 'm+n' number of secondary windings. The primary windings are connected to the output terminals of the FB converters, i.e., each of the 'p' AC signals are connected to each of the 'p' primary windings. The isolation transformer generates a second set of AC signals using a first set of secondary windings, and a third set of AC signals using a second set of secondary windings. There is 'm' number of AC signals in the second set of AC signals, in which each of the 'm' AC signals is generated through each of the 'm' secondary windings (first set of secondary windings). Similarly, there is 'n' number of AC signals in the third set of AC signals, in which each of the 'n' AC signals is generated through each of the 'n' secondary windings (second set of secondary windings).

The output stage consists of a first set of AC-DC converters, FB-21 to FB-2m, a second set of AC-DC converters, FB-31 to FB-3n, and a set of DC-AC converters, FB-41 to FB-4m. The first set of AC-DC electronic converters converts the second set of AC signals into a set of DC signals. Each of the 'm' AC signals (second set of AC signals) is derived from each of the 'm' secondary windings (first set of secondary windings). Each of the 'm' AC signals is fed to each AC-DC electronic converter, amongst the first set of AC-DC electronic converters.

The second set of AC-DC electronic converters converts the third set of AC signals into a DC ($V_{dc2}$) component. Each of the 'n' AC signals (third set of AC signals) is derived from each of the 'n' secondary windings (second set of secondary windings). Each of the 'n' AC signals is fed to each AC-DC electronic converter, amongst the second set of AC-DC electronic converters.

The set of DC-AC electronic converters converts the set of DC signals, from the first set of DC-AC electronic converters, into an AC component ($V_{ac1}$). Each of the DC-AC electronic converters obtains a DC signal, amongst the set of DC signals. The AC and DC components are combined to obtain the output ACsDC signal ($V_{out}$).

Figure 24:
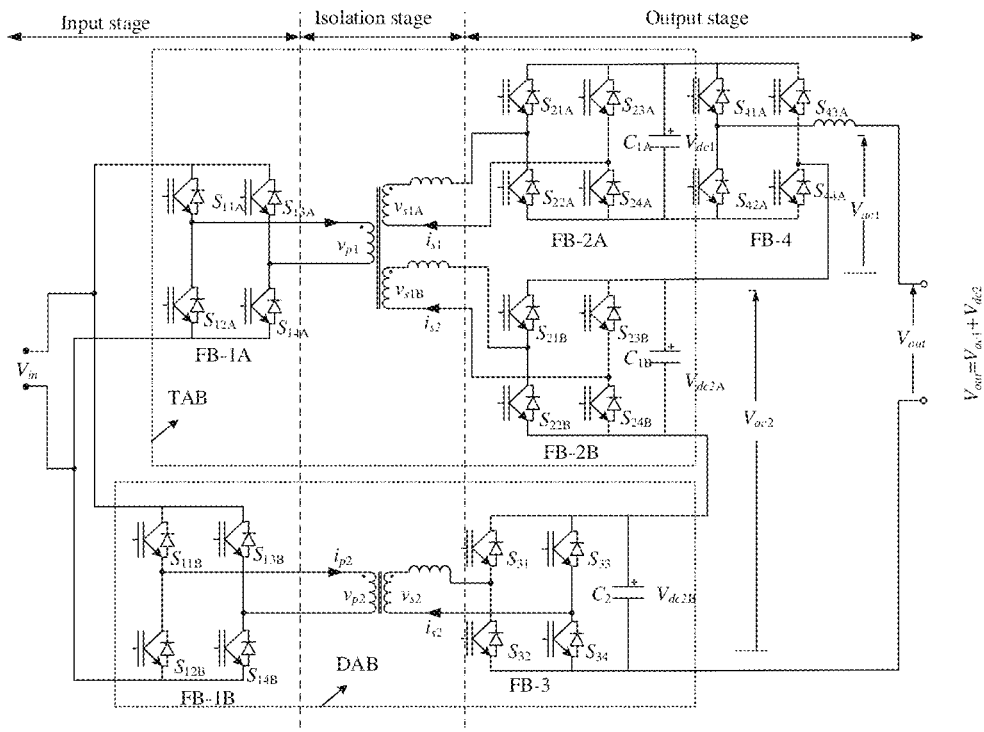
FIG. 24 illustrates a topology derived from the DAB based ACsDC converter and the TAB based ACsDC converter, according to an embodiment as disclosed herein.

FIG. 24 illustrates a topology derived from the DAB based ACsDC converter and the TAB based ACsDC converter, according to an embodiment as disclosed herein.

The embodiment of the ACsDC converter is based on the DAB based ACsDC converter (FIG. 4) and TAB based ACsDC converter (FIG. 9). The input stage consists of an electronic converter, which generates a first AC signal and a second AC signal. The first AC signal is fed to the primary winding of the first isolation transformer. The second AC signal is fed to the primary winding of the second isolation transformer. The isolation stage consists of the first isolation transformer and the second isolation transformer. The first isolation transformer is having two secondary windings, in which the first secondary winding generates the third AC signal, and the second secondary winding generates the fourth AC signal. The secondary winding of the second isolation transformer generates the fifth AC signal.

The output stage consists of a first AC-DC electronic converter (FB-2A), a second AC-DC electronic converter (FB-2B), a third AC-DC electronic converter (FB-5), and a DC-AC electronic converter (FB-4). The first AC-DC electronic converter converts the third AC signal into a DC signal. The FB-2A derives the third AC signal from the first secondary winding of the first isolation transformer. The DC-AC electronic converter converts the DC signal obtained from the first AC-DC electronic converter (FB-2A) into an AC component ($V_{ac1}$). The second AC-DC electronic converter converts the fourth AC signal into a first DC component ($V_{dc2A}$). The fourth AC signal is derived from the second secondary winding of the first isolation transformer. The third AC-DC electronic converter converts the fifth AC signal into a second DC component ($V_{dc2B}$). The fifth AC signal is derived from the secondary winding of the second isolation transformer.

As depicted FIG. 24, the output DC voltage from the FB-2A (TAB), i.e., $V_{dc1}$, is used to obtain the AC component ($V_{ac1}$) of the output ACsDC voltage. The output DC voltage (first DC component) from the FB-2B (TAB), i.e., $V_{dc2A}$, and the output DC voltage (second DC component) from the FB-5 (DAB), i.e., $V_{dc2B}$, is connected in series; for obtaining the DC component of the output ACsDC voltage ($V_{dc2}$). At the output stage, $V_{ac1}$ and $V_{dc2}$ are connected in series to obtain the output ACsDC voltage.

More embodiments can be derived in addition to the embodiments as depicted in FIG. 22, FIG. 23, and FIG. 24. The derived additional embodiments can also generate ACsDC signal. In an example, in FIG. 24, TAB can be replaced with DT-ATAB to obtain DAB and DT-ATAB based ACsDC converter. Similarly, multiple combinations of two-winding transformers and multi-winding transformer can be used to obtain different types of ACsDC converter.

Figure 25:
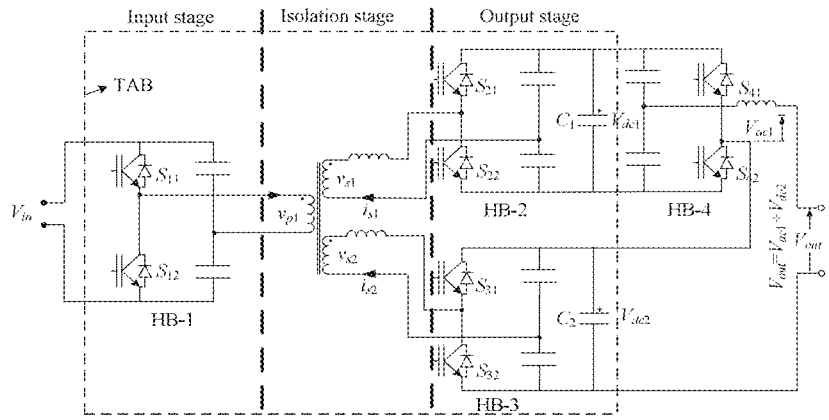
FIG. 25 illustrates the TAB based ACsDC converter, in which Half Bridges (HB) are used as AC-DC and DC-AC converters, according to an embodiment as disclosed herein.

FIG. 25 illustrates the TAB based ACsDC converter, in which Half Bridges (HB) are used as AC-DC and DC-AC converters, according to an embodiment as disclosed herein.

In the disclosed embodiments of the proposed ACsDC converter, full bridge converters (FB) are used as the input stage electronic converters, AC-DC converters, and DC-AC converters. The FBs can be replaced with HB converters to minimize the switching device requirement for low voltage applications. In an example, an embodiment of the TAB based ACsDC converter with the HB converters as AC-DC and DC-AC power converters is depicted in FIG. 25. Similarly, the other embodiments of ACsDC converters with HBs as AC-DC and DC-AC converters can be derived.

Figure 26:
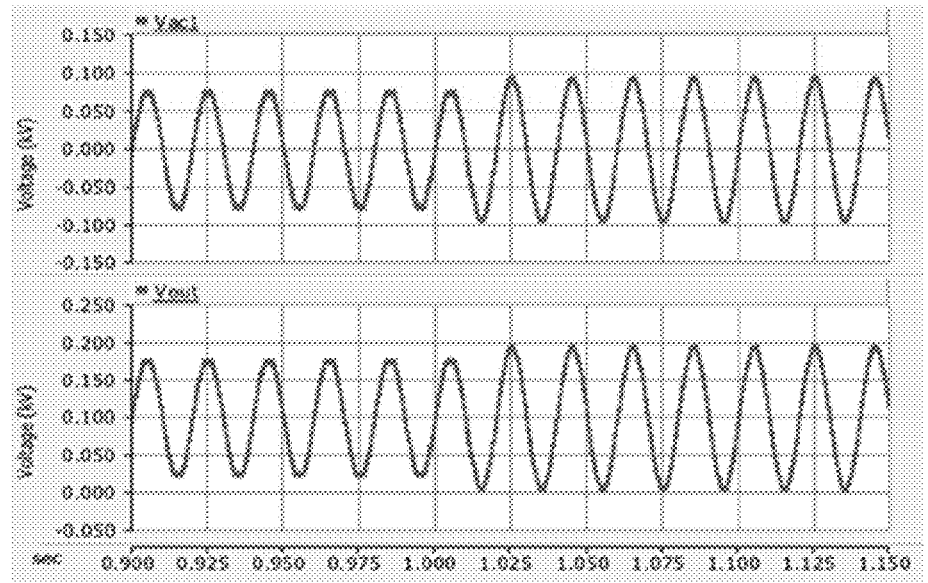
FIG. 26 is a graph depicting variation of magnitude of AC component, for independent control of AC and DC components, of the output ACsDC signal, according to an embodiment as disclosed herein.

FIG. 26 is a graph depicting variation of magnitude of AC component, for independent control of AC and DC components, of the output ACsDC signal, according to an embodiment as disclosed herein.

In order to demonstrate that the AC and DC components, obtained using the proposed embodiments, are flexible; the DT-ATAB based ACsDC converter is operated in different possible conditions. The obtained results are discussed in FIGS. 26-29.

The condition for obtaining a variable magnitude of the AC component of the output ACsDC signal is depicted in FIG. 26. As depicted in FIG. 26, for t<1.2 s, the modulation index ($m_a$) of SPWM technique is maintained at 0.8 at t=1.2 s and $m_a$ is changed to 0.9. It can be observed in the FIG. 26 that the magnitude of the AC component of the output ACsDC signal can be varied by controlling $m_a$.

Figure 27:
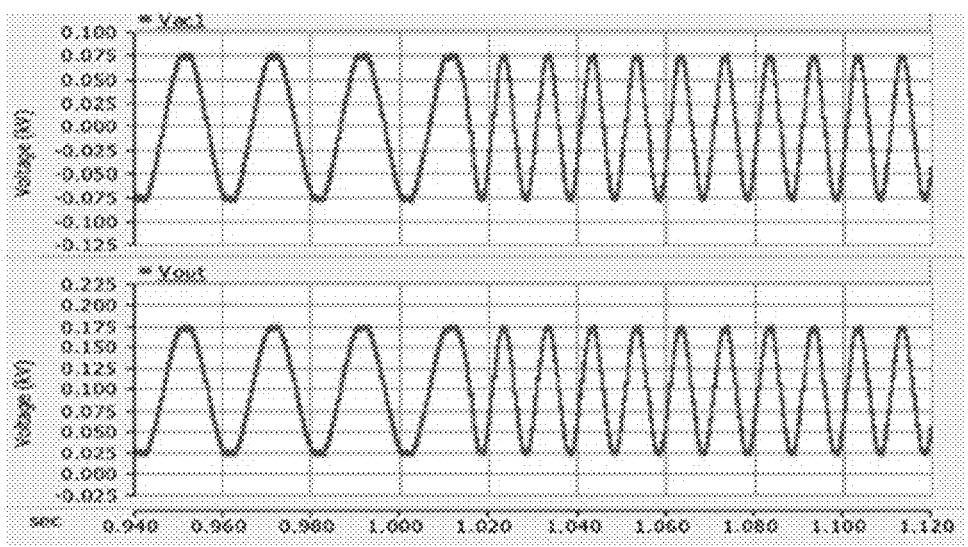
FIG. 27 is a graph depicting variation of frequency of AC component, for independent control of AC and DC components, of the output ACsDC signal, according to an embodiment as disclosed herein.

FIG. 27 is a graph depicting variation of frequency of AC component, for independent control of AC and DC components, of the output ACsDC signal, according to an embodiment as disclosed herein.

As depicted in FIG. 27, the frequency of the reference signal of SPWM is changed from 50 Hz to 100 Hz at t=1.01 s. It is illustrated that the frequency of the AC component of the output ACsDC signal, obtained through the embodiments of the proposed ACsDC converter, can be varied according to requirements.

Figure 28:
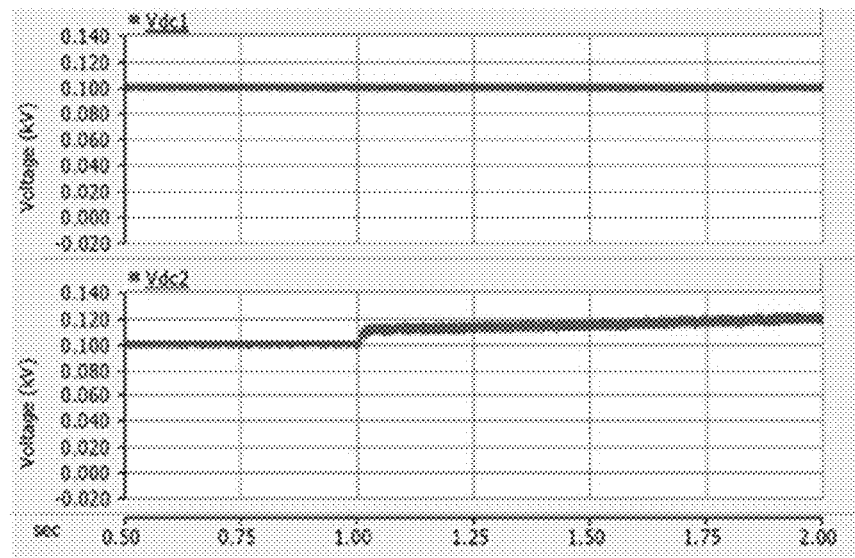
FIG. 28 is a graph depicting of DC component voltage variation for independent control of AC and DC components of an output voltage, according to an embodiment as disclosed herein.

FIG. 28 is a graph depicting of DC component voltage variation for independent control of AC and DC components of an output voltage, according to an embodiment as disclosed herein.

Figure 29:
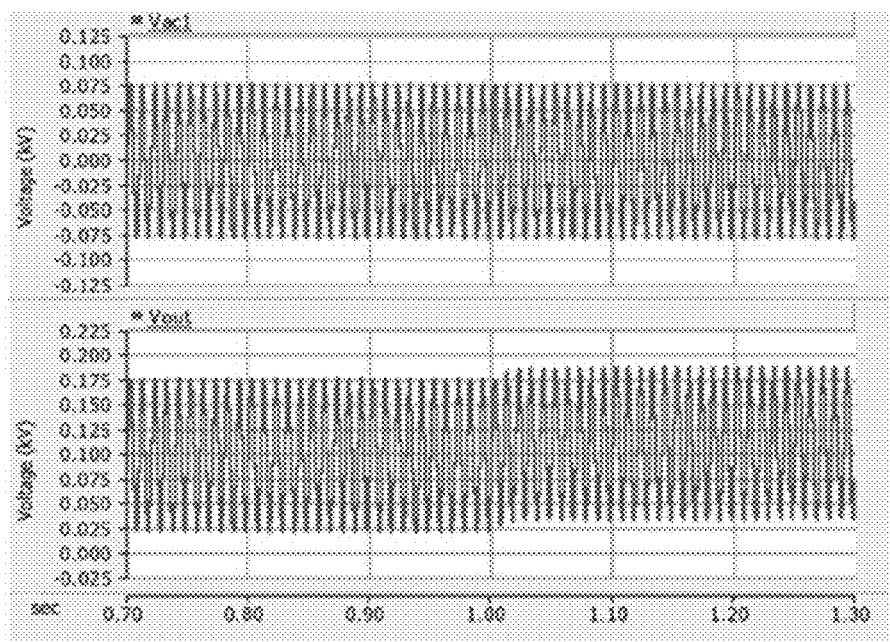
FIG. 29 is a graph depicting of DC component voltage variation for independent control of AC and DC components of an output voltage, according to an embodiment as disclosed herein.

In the case study of FIGS. 28-29, the DC component ($V_{dc2}$) of the output voltage is changed from 100 V to 120 V at t=1 s.

FIG. 29 is a graph depicting DC component voltage variation for independent control of AC and DC components of an output voltage, according to an embodiment as disclosed herein.

It can be observed from the FIG. 18 that the AC component of the output voltage ($V_{ac1}$) remains unchanged and the DC component is shifted to 120 V at t=1 s. The simulation results of FIGS. 26-29 verify that the embodiments of the proposed ACsDC converter can be controlled, thereby enabling the AC and DC components of the output ACsDC signal to be flexible.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. An apparatus for generating an AC superimposed DC (ACsDC) signal, the apparatus comprising:
   an electronic converter for generating a first AC signal and a second AC signal, wherein a DC signal, derived from one DC source or an AC source, is fed to the electronic converter;
   a first isolation transformer for generating a third AC signal;
   a second isolation transformer for generating a fourth AC signal,
   wherein the first AC signal is fed to the first isolation transformer and the second AC signal is fed to the second isolation transformer;
   a first AC-DC electronic converter for converting the third AC signal into a DC signal, wherein the third AC signal is derived from the first isolation transformer;
   a DC-AC electronic converter for converting the DC signal obtained from the first AC-DC electronic converter into an AC component;
   a second AC-DC electronic converter for converting the fourth AC signal into a DC component, wherein the fourth AC signal is derived from the second isolation transformer; and
   wherein the ACsDC signal is generated by combining the AC component and the DC component.

2. The apparatus of claim 1, wherein the electronic converter includes a first full bridge converter and a second full bridge converter, wherein the first full bridge converter generates the first AC signal and the second full bridge converter generates the second AC signal.

3. The apparatus of claim 1, wherein the electronic converter is a Three Leg Converter (TLC), wherein the TLC generates the first AC signal and the second AC signal.

4. The apparatus of claim 1, wherein the first AC-DC electronic converter, the second AC-DC electronic converter, and the DC-AC electronic converter is a full bridge converter.

5. An apparatus for generating an AC superimposed DC (ACsDC) signal, the apparatus comprising:
   an electronic converter for generating a first AC signal, wherein a DC signal derived from one of a DC source and an AC source is fed to the electronic converter;
   an isolation transformer with a primary winding and a first secondary winding for generating a second AC signal and a second secondary winding for generating a third AC signal;
   a first AC-DC electronic converter for converting the second AC signal into a DC signal, wherein the second AC signal is derived from the first secondary winding;

a DC-AC electronic converter for converting the DC signal obtained from the first AC-DC electronic converter into an AC component;
a second AC-DC electronic converter for converting the third AC signal into a DC component, wherein the third AC signal is derived by the second AC-DC electronic converter from the second secondary winding; and
wherein the ACsDC signal is generated by combining the AC component and the DC component.

6. The apparatus of claim 5, wherein the electronic converter, the first AC-DC electronic converter, the second AC-DC electronic converter, and the DC-AC electronic converter are made using a full bridge converter as the basic building block.

7. The apparatus of claim 5, wherein the electronic converter, the first AC-DC electronic converter, the second AC-DC electronic converter, and the DC-AC electronic converter is a half bridge converter.

8. An apparatus for generating an AC superimposed DC (ACsDC) signal, the apparatus comprising:
an electronic converter for generating a first set of AC signals and a second set of AC signals, wherein a DC signal, derived from one of a DC source and an AC source, is fed to the electronic converter;
a first set of isolation transformers for generating a third set of AC signals, wherein each AC signal, amongst the first set of AC signals, is fed to each isolation transformer, amongst the first set of isolation transformers;
a second set of isolation transformers for generating a fourth set of AC signals, wherein each AC signal, amongst the second set of AC signals, is fed to each isolation transformer, amongst the second set of isolation transformers;
a first set of AC-DC electronic converters for converting the third set of AC signals into a set of DC signals, wherein each AC signal, amongst the third set of AC signals, is fed to each AC-DC electronic converter, amongst the first set of AC-DC electronic converters;
a set of DC-AC electronic converters for converting the set of DC signals into an AC component, wherein each DC-AC electronic converter, amongst the set of DC-AC converters, obtains a DC signal, amongst the set of DC signals;
a second set of AC-DC electronic converters for converting the fourth set of AC signals into a DC component, wherein each AC signal, amongst the fourth set of AC signals, is fed to each AC-DC electronic converter, amongst the second set of AC-DC electronic converters, wherein the fourth set of AC signals is derived from the second set of isolation transformers; and
wherein the ACsDC signal is generated by combining the AC component and the DC component.

9. The apparatus of claim 8, wherein the electronic converter includes a first set full bridge converters and a second set of full bridge converters, wherein the first set of full bridge converters generates the first set of ACs signal and the second set of full bridge converters generates the second set of AC signals.

10. The apparatus of claim 8, wherein the electronic converter is a Three Leg Converter (TLC), wherein the TLC generates the first set of AC signals and the second set of AC signals.

11. The apparatus of claim 8, wherein the first set of AC-DC electronic converters, the second set of AC-DC electronic converters, and the set of DC-AC electronic converters are made using a full bridge converter as basic building block.

12. An apparatus for generating an AC superimposed DC (ACsDC) signal, the apparatus comprising:
an electronic converter for generating a first set of AC signals, wherein a DC signal derived from one of a DC source and an AC source is fed to the electronic converter;
an isolation transformer with a set of primary windings and a first set of secondary windings for generating a second set of AC signals and a second set of secondary windings for generating a third set of AC signals;
a first set of AC-DC electronic converters for converting the second set of AC signals into a set of DC signals, wherein each DC signal, amongst the set of DC signals, is derived from each secondary winding, amongst the first set of secondary windings;
a set of DC-AC electronic converters for converting the set of DC signals into an AC component, wherein each DC signal, amongst the set of DC signals, is fed to each DC-AC electronic converter, amongst the set of DC-AC electronic converters;
a second set of AC-DC electronic converters for converting the third set of AC signals into a DC component, wherein each AC signal, amongst the third set of AC signals, is derived from each secondary winding, amongst the second set of secondary windings; and
wherein the ACsDC signal is generated by combining the AC component and the DC component.

13. The apparatus of claim 12, wherein the electronic converter comprises of a set of full bridge converters, wherein each full bridge converter, amongst the set of full bridge converters, generates an AC signal, amongst the first set of AC signals.

14. The apparatus of claim 12, wherein the first set of AC-DC electronic converters, the second set of AC-DC electronic converters, and the set of DC-AC electronic converters are made using a full bridge converter as basic building block.

15. An apparatus for generating an AC superimposed DC (ACsDC) signal, the apparatus comprising:
an electronic converter for generating a first AC signal, and a second AC signal, wherein a DC signal, derived from one of a DC source and an AC source, is fed to the electronic converter;
a first isolation transformer with a primary winding and, a first secondary winding for generating a third AC signal and a second secondary winding for generating a fourth AC signal, wherein the first AC signal is derived from the electronic converter;
a second isolation transformer for generating a fifth AC signal, wherein the second AC signal is derived from the electronic converter;
a first AC-DC electronic converter for converting the third AC signal into a DC signal, wherein the third AC signal is derived from the first secondary winding;
a DC-AC electronic converter for converting the DC signal obtained from the first AC-DC electronic converter into an AC component;
a second AC-DC electronic converter for converting the fourth AC signal into a first DC component, wherein the fourth AC signal is derived by from the second secondary winding;
a third AC-DC electronic converter for converting the fifth AC signal into a second DC component, wherein the fifth AC signal is derived by the third AC-DC electronic converter from the second isolation transformer; and wherein the ACsDC signal is generated by combining the AC component and the first DC component and the third DC component.

16. The apparatus of claim 15, wherein the electronic converter includes a first full bridge converter and a second full bridge converter, wherein the first full bridge converter generates the first AC signal and the second full bridge converter generates the second AC signal.

17. The apparatus of claim 16, wherein the first AC-DC electronic converter, the second AC-DC electronic converter, the third AC-DC electronic converter, and the DC-AC electronic converter are made using a full bridge converter as basic building block.

* * * * *